United States Patent [19]

Torghele

[11] Patent Number: 4,483,815

[45] Date of Patent: Nov. 20, 1984

[54] PROCESS AND DEVICE FOR VULCANIZING WITH CONTINUITY ELASTOMERIC MATERIAL HOSES

[75] Inventor: Flavio Torghele, Milan, Italy

[73] Assignee: TREG S.p.A., Veniano, Italy

[21] Appl. No.: 456,981

[22] Filed: Jan. 10, 1983

Related U.S. Application Data

[63] Continuation of Ser. No. 232,624, Feb. 9, 1981, abandoned.

[30] Foreign Application Priority Data

Mar. 31, 1980 [IT] Italy ............................. 21057 A/80

[51] Int. Cl.³ .................... B29C 17/02; B29H 5/28
[52] U.S. Cl. ............................... 264/566; 264/231;
264/236; 264/347; 425/97; 425/174.6; 425/392;
425/445
[58] Field of Search ............... 264/347, 236, 231, 229,
264/566; 425/97, 445, 392–393, 174.6

[56] References Cited

U.S. PATENT DOCUMENTS

| | | | |
|---|---|---|---|
| 1,939,871 | 12/1933 | Bedur | 264/231 |
| 2,226,768 | 12/1940 | Harrison | 264/566 |
| 2,616,126 | 11/1952 | Merck et al. | 425/97 |
| 2,688,768 | 9/1954 | Rayburn | 425/97 |
| 2,984,870 | 5/1961 | Warnken | 264/229 |
| 3,359,357 | 12/1967 | Bentley, Jr. et al. | 264/229 |
| 4,026,747 | 5/1977 | DeLorean et al. | 264/229 |
| 4,106,967 | 8/1978 | Logan et al. | 264/236 |
| 4,155,790 | 5/1979 | Galloway | 264/231 |

FOREIGN PATENT DOCUMENTS

692022  8/1964  Canada ......................... 264/231

*Primary Examiner*—Jeffery Thurlow
*Attorney, Agent, or Firm*—Stevens, Davis, Miller & Mosher

[57] ABSTRACT

Elastomeric hoses are vulcanized by a process wherein the outer surface layer (sheath) is completely vulcanized while the remainder remains unvulcanized. The surface layer and part of the resistant structure are maintained in an elastic elongated state while vulcanizing the remainder of the hose. An apparatus for vulcanizing the hose in accordance with the process is disclosed.

5 Claims, 4 Drawing Figures

PROCESS AND DEVICE FOR VULCANIZING WITH CONTINUITY ELASTOMERIC MATERIAL HOSES

This is a continuation of application Ser. No. 232,624 filed Feb. 9, 1981, now abandoned.

This invention relates to a process for vulcanizing elastomeric hoses and, in particular, hoses having an elastomeric wall with a reinforcing structure embedded in the wall. The present invention also relates to a device for vulcanizing continuous lengths of elastomeric hoses.

Various processes are known for continuously vulcanizing elastomeric hoses. These known processes can be grouped into two groups.

In accordance with a first group of known processes for continuously vulcanizing elastomeric hoses, the external uncured elastomeric surface of the hose is covered with a sheath, generally of lead, and the hose is vulcanized while covered with the sheath by passing it through an autoclave into which there is introduced a pressurized fluid. The sheath is removed after the hose has been vulcanized.

The processes involved in the first group produce theoretically, perfectly shaped hoses, which have an outer surface that is perfectly smooth and compact, i.e. free from any porosity. But, the production rate from these processes is extremely low, owing at least partially to the time required for forming the sheath around the hose. In the second place, it is practically impossible to obtain a perfect surface on the outside of the hose because of the inevitable scorings or incisions made by the knife or other sharp instrument used to remove the sheath. In the third place, the cost of vulcanizing the hoses is extremely high because of the two steps of forming the sheath and of removing it.

In a second group of known continuous processes for vulcanizing hoses, the uncured elastomeric hoses are passed through a bath of hot liquid, for example, melted salts, to provide the necessary heat for vulcanizing the hose.

The processes of the second group produce hoses at a high production rate but have the serious drawback that a large percentage of the hoses are porous.

Moreover, none of the known processes produces hoses having a perfectly smooth inner bore.

An object of the invention is to provide a process for vulcanizing an elastomeric hose which is devoid of the foregoing disadvantages. Another object of the invention is to provide a process for vulcanizing lengths of an elastomeric hose continuously. Still another object of the invention is to provide an improved process for vulcanizing at a high production rate an elastomeric hose having a substantially smooth external surface with a minimum risk of the smooth surface becoming damaged during the vulcanization process. A further object of the invention is to provide a vulcanized elastomeric hose having a substantially smooth surface about the bore through the hose and a process for making such a hose.

Other objects will become apparent from the following description with reference to the accompanying drawing wherein.

Figure 1:
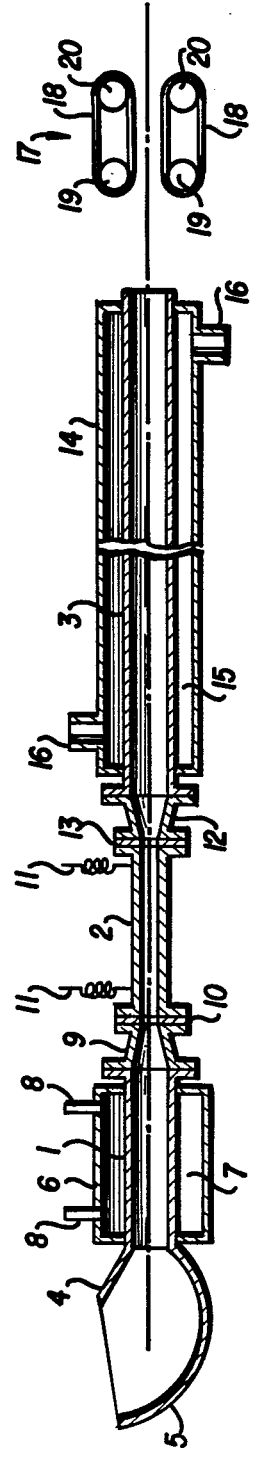
FIG. 1 is a longitudinal sectional view of one embodiment of a device provided by the invention for vulcanizing continuous lengths of an elastomeric hose.

The foregoing objects and others are accomplished in accordance with this invention, generally speaking, by providing a process for vulcanizing an uncured elastomeric hose continuously and for embedding in the hose wall a stress resistant insert member wherein mechanical pressure is applied to the uncured external wall of the hose while the hose is heated to vulcanize the elastomeric component to avoid change in cross-section of the bore in the hose during vulcanization. The invention also provides a device for vulcanizing an elastomeric hose continuously having arranged in series in the direction in which the hose is advanced a first tubular member having a cross-section larger than the cross-section of the hose to be vulcanized and provided with a heating unit for heating the hose, a second tubular member having a heater and connected to the downstream end of the first tubular member, the cross-section of the bore of the second tubular member being substantially equal to the outer cross-sectional dimension of the hose and smaller than the cross-section of the hose of the first tubular member whereby the external surface of the hose is heated by the first and second tubular members of the device as the hose is passed therethrough and the external surface of the hose is compressed by the second tubular member, a third tubular member connected to the downstream end of the second tubular member having means for heating the surface of the hose about the bore and a draft gear disposed downstream of the third tubular member which draws the hose through the three tubular members.

In its broader aspects, the invention contemplates continuously vulcanizing an elastomeric hose by a process wherein only the longitudinal stress resistant structure of the hose is elastically elongated while mechanical pressure and heat are applied through the external surface of the hose to vulcanize the elastomeric material of the hose.

According to a preferred embodiment of the process of the present invention, the outer surface layer of the hose, is first completely vulcanized while maintaining uncured, the remaining elastomeric material of the hose. The vulcanization of the outer surface of the hose is achieved by applying mechanical pressure to the external hose surface while heating through its outer surface.

In this way, the dimensions of the external surface of the hose are established and a smooth and compact external surface is obtained.

In a second step of the vulcanizing process, the already vulcanized outer surface of the hose is subjected to elastic elongation and the same applies to the longitudinal component of the stress resistant structure of the hose by simultaneously providing heat to the hose through the outer hose surface.

During this step, because of the elastic elongation of the outer surface layer of the hose, mechanical pressure is exerted over the elastomeric material of the hose that is still in its uncured state, and as a result, during vulcanization of the remaining part of the elastomeric material forming the hose, no porosity forms in the walls of the hose.

In FIG. 1, a device for vulcanizing uncured elastomeric hoses according to the process of the invention is shown.

As can be seen in FIG. 1, the device comprises a series of three tubular bodies, a first tubular body 1, a second tubular body 2 and a third tubular body 3, connected end-to-end in series.

Upstream of the first tubular body, i.e. to the left side of the tubular body 1 as shown in FIG. 1, a frusto-conically shaped coupling member 4 is connected to tubular body 1 at its smaller base. A chamber 5 disposed in frusto-conical member 4 contains a lubricating oil adjacent to the larger base.

A housing 6 is disposed around the first tubular body 1 to form between them a jacket 7 into which, through conduits 8, a warm fluid is circulated, for example, saturated steam, to heat the first tubular body 1.

A frusto-conically shaped coupling 9 connects the first tubular body 1 to the second tubular body 2. An electrical insulating gasket 10 is disposed between the flanged ends of body member 2 and connecting member 9.

The second tubular body 2, is connected to electrical resistant circuit 11. An electrical current is passed through circuit 11 to heat the entire tubular body 2 a desired constant temperature.

The bore of tubular body 2 has a diameter which is substantially equal to the diameter of the hose to be vulcanized.

A third tubular body member 3 is disposed downstream of the second tubular body member 2. A frusto-conically shaped coupling member 12 connects tubular body 2 with tubular body 3.

The frusto-conically shaped coupling member 12, is directly connected, through its larger base, to the third tubular body member 3 and is connected through its smaller base, to the second tubular body 2. An electrical insulating gasket 13 is disposed between tubular member 11 and coupling member 12.

The third tubular body 3, is covered by a radially spaced housing 14 with an annular space 15 within which a heating fluid (example, saturated steam) is circulated by means of conduits 16.

Downstream of the third tubular body 3, there is positioned a drawing device 17, formed by two endless belts 18 and 18A driven by rollers 19 and 20, one of which is a driving-roller, while the other is a return-roller.

The functioning of the described device is as follows:

An uncured elastomeric hose, in which is present a fluid (e.g. pressurized air) enters, in a continuous manner, into the device through coupling 4 and is pulled by assembly 17, by the end that is downstream of the third tubular body.

Figure 2:
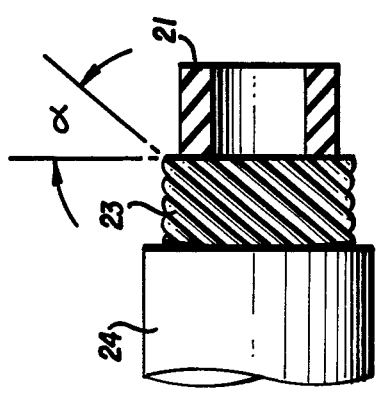
FIG. 2 is a side elevation with parts broken away of a linear segment of a hose to be vulcanized.

The uncured, elastomeric hose, that is already prepared before it enters the device where it will be vulcanized, has, for example, the structure shown in FIG. 2.

Figure 4:
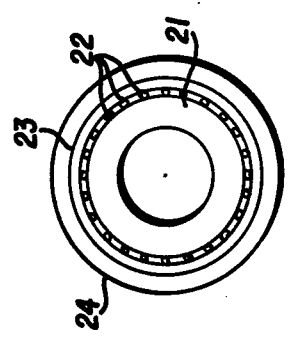
FIG. 4 is a cross-section of the hose illustrated in FIG. 3.

As can be seen in FIG. 2, the hose has, proceding from the inside towards the outside, a core tube 21, a plurality of circumferentially spaced longitudinally extending wires or cords 22 embedded in the core tube or in the surface of the core tube and disposed along the hose axis, and forming, as a whole, a structure resistant against elongation of the hose. Around the inner tubular layer or core tube 21, there is disposed a helically wound wire or cord 23, that constitutes the transverse resistant structure of the hose, and around the said transverse resistant hose structure, a tubular covering layer or sheath 24 of an elastomeric material is disposed. (see also FIG. 4).

The angle of inclination of the helically wound wire, is larger than that established as optimum for the vulcanized hose.

The uncured elastomeric hose, before entering the first tubular body 1, is preheated, and in particular, the external surface layer of the hose is preheated.

Moreover, the uncured hose, as it gradually enters into the first tubular body 1, carries along with it the lubricant present inside the chamber 5, and because of the chamber of the frusto-conical coupling 4, the pressure of the lubricant carried by the hose rises inside the first tubular body, since the frusto-conical coupling is convergent towards the entrance opening of the first tubular body.

The hose thus preheated by passing it through the first tubular body 1, now passes through the second tubular body 2, where it comes into contact with the surface of the inner cavity of the second tubular body.

The external surface of the hose, is mechanically pressed by the wall of the bore through body 2 and the complete vulcanization of the outer surface layer of the hose takes place, while the remaining part of the hose remains in its uncured state.

The hose, enters the second tubular body through the frusto-conical coupling 9, which being convergent towards the entrance opening of the second tubular body, forces the lubricant that was present inside the first tubular body, to pass into the second tubular body, substantially increasing its pressure; thus guaranteeing the formation of a continuous film of lubricant around the hose, while it is in the second tubular body.

Inside the second tubular body, the outer elastomeric material of the hose is plasticized and vulcanized completely while the outer elastomeric surface is under mechanical pressure from compression as it moves through the second tubular body.

The hose, with its already vulcanized external surface layer, emerges from the second tubular body and enters the third tubular body through the frustoconical coupling 12 that diverges towards the third tubular body.

During its passage through the coupling 12, owing to the divergence of the latter in the advancing direction of the tube the pressure of the lubricant that covers the hose is reduced as it passes into the third tubular body 3. This facilitates the passage of the lubricant inside the device.

When the hose passes through the third tubular body 3, vulcanization of the remaining unvulcanized elastomeric material is completed and the hose is advanced by subjecting it to traction by member 17 placed downstream of the third tubular body 3.

The hose portion passing through the third tubular body 3 is subjected to traction by member 17.

Figure 3:
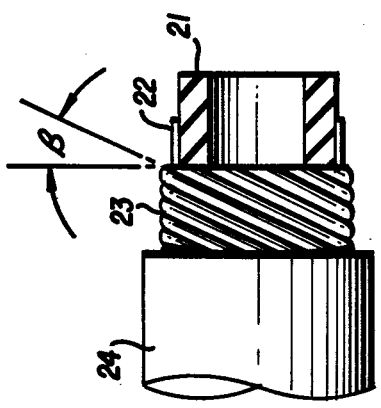
FIG. 3 is a side elevation with parts broken away of a linear segment of one embodiment of a hose after vulcanization provided by the invention.

From this traction by member 17, the hose length present in the third tubular body 3, is subjected to tractional stresses that provoke an elastic elongation of the longitudinal resistant structure of the hose, i.e., of the wires or cords 22, an elastic elongation of the outer surface layer of hose that is already completely vulcanized, and deformation of the transverse resistant structure of the hose, i.e., of the helical turns of wire or cord 23 that assume the angle B represented in FIG. 3, and is smaller than the angle represented in FIG. 2.

As regards the values of the tractional stresses that provoke an elastic elongation of the longitudinal resistant structure of the hose and of the completely vulcanized outer surface layer of the hose they must be lower than the limit value provoking permanent deformation in the weakest of said components subjected to elastic elongation.

As a result, the completion of the vulcanization of the elastomeric material of the hose takes place while the outer surface layer that is already vulcanized, and the longitudinal resistant structure of the hose, are in an elastically elongated condition. Under the action of the traction of the pulling member 17 on the hose through the third tubular body 3, and hence following the elastic elongation of the outer surface layer that is already completely vulcanized, a reduction in the outer diameter of the hose occurs which brings about the following three consequences (that explain the achieving of the aims proposed by the present invention):

(a) it facilitates sliding of the hose into the third tubular body 3, allowing the hose to be drawn at high speeds through the vulcanizing device with a consequent high production output of the device, (b) a mechanical pressure is exerted on the inner elastomeric layer still in its uncured state, by the outer already vulcanized layer, for which reason, during the completion of the vulcanizing of the hose, there is obtained a hose with walls that are prefectly compact and devoid of porosity;

(c) the internal diameter of the hose remains constant, the surface of the inner cavity of the hose is perfectly smooth and it is possible to form a circular or a polygonal inner hose cavity having a number of sides equal to the number of wires or cords that form the longitudinal resistant hose structure.

In fact, since during the completion of the vulcanization, the hose structure which resists elongation is placed in a condition of being elastically elongated, slipping occurs between the resistant structure and the layer of the hose that is not yet vulcanized.

Hence, once the total vulcanization of the hose is terminated and once the stresses have been removed in the longitudinal resistant hose structure, which is the situation presented downstream of member 17, elastic return of the longitudinal resistant structure of the hose occurs.

With the elastic return of the longitudinal structure of the hose, the layer of elastomeric material 21 inside the hose, is compressed, and this causes compacting of the inner surface of the hose cavity and the formation of a polygonal form of the cavity of the hose. The polygonal form becomes circular when the longitudinal structure of the hose is formed by a plurality of side-by-side wires.

From the considerations, it can be seen that with the process and the device provided the present invention, the proposed objects can be achieved.

Although the invention has been described in detail for the purpose of illustration, it is to be understood that such detail is solely for that purpose and that variations can be made therein by those skilled in the art without departing from the spirit and scope of the invention except as it may be limited by the claims. Any hose having vulcanizable components such as a natural or synthetic rubber, such as Neoprene or the like, core tube and/or sheath may be vulcanized by the process and in the apparatus provided by the invention. Further, any hose having curable by cross-linking material components such as curable synthetic resinous material may be cross-linked, i.e. vulcanized with the process and with the apparatus provided by the invention.

What is claimed is:

1. A process for continuously vulcanizing an assembled uncured elastomeric hoses having an outer surface, a remaining elastomeric material inside said outer surface, a longitudinal resistant structure embedded in said hose, and an uncured hollow core tube comprising the steps of:
   a. conveying said hose, with its hollow tube core under pressurization, through a first hollow vulcanizng tube while simultaneously heating and compressing the uncured outer layer of said hose, said heating and compressing being performed to an extent such that only the uncured outer layer is at least partially vulcanized and the remaining part of the hose is left substantially uncured;
   b. elastically elongating the already vulcanized outer surface layer of the hose and the longitudinal resistant structure of the hose through the application of tractional stresses to the hose;
   c. maintaining the remaining elastomeric material and core tube in the uncured state while applying said tractional stresses for elastically elongating the already vulcanized outer surface of the hose and deforming permanently the remaining part of the hose and the core tube through said tractional stresses;
   d. then completing the vulcanization of the remaining elastomeric material and core tube while the outer surface layer that is already vulcanized, and the longitudinal resistant structure of the hose, are in an elastically elongated condition;
   e. removing the stresses in the longitudinal resistant hose structure, thus causing, with the elastic return of the longitudinal resistant structure and of the outer surface of the hose, which has more energy, the compression of the elastomeric material inside the hose and the compacting of the core tube.

2. A process as in claim 1, in which said tractional stresses applied to the hose for causing an elastic elongation of the longitudinal resistant structure of the hose and of the completely vulcanized outer surface of the hose is of a value lower than the limit value causing permanent deformation in the weakest of the components subjected to elastic elongation, whereby the longitudinal resistant structure of the hose and the outer surface of the hose have an elastic return after the removing of said tractional stresses.

3. An apparatus for continuously vulcanizing an assembled but uncured elastomeric hose already having an uncured hollow core tube, traction-resistant reinforcement members embedded in said core tube, a transverse resistant reinforcement member surrounding said core tube, and an uncured outer layer around said transverse resistant reinforcement member and extending along the length of the hose, said apparatus comprising, on the same axis as that of the hose passing through the apparatus, a first tubular member having an inner surface about a cavity and means for heating said inner surface, said cavity having a larger diameter than the diameter of the outer surface of the hose;
   a second tubular member, comprising means for vulcanizing only the outer layer of the hose and disposed downstream from the first tubular member and in substantial axial alignment therewith, means for heating the second tubular member to a uniform temperature over the entire length thereof, said second tubular member having a bore with a diameter which is substantially equal to the outer dimensions of the hose, whereby direct contact and mechanical pressure is effected between the entire external surface of the hose and the heated wall of the bore as the hose is pulled through the second tubular body;

a third substantially axially aligned tubular body comprising means for vulcanizing the remaining part of the hose connected to the second tubular member by a coupling member which diverges towards the third tubular body, a cavity therein of larger diameter than said second tubular body, means for heating the inner surface of the cavity to vulcanize the entire hose, including the core tube thereof;

means for the exertion of an opposing force of pressurized fluid inside the hose, said means being used in combination with said vulcanizing means;

and substantially axially aligned means downstream of the third tubular body for applying a traction force on the hose whereby the previously vulcanized outer layer of the hose is elastically elongated in relation with the yet uncured core tube which is subsequently cured while passing through the third tubular body and while under traction.

4. The apparatus of claim 3, comprising a first frusto-conical coupling member which converges in the downstream direction towards the upstream end of the first tubular body and forms a conduit through the first tubular body, means in said frusto-conical member for lubricating a hose as it passes therethrough, and between said first and second tubular body a second frusto-conical coupling member which converges towards the second tubular body to increase the pressure of the said lubricant, a third frusto-conical coupling member which diverges towards the third tubular body disposed between the second and third tubular bodies wherein the pressure of the lubricant is reduced to assist passage of the lubricant into the third tubular body.

5. The apparatus of claim 3, wherein the means for heating the inner surface of the bores through the first and third tubular body comprises a jacket for circulating heating fluids, and the second tubular body comprises an electrical means for heating the hose.

* * * * *